United States Patent [19]

Yee

[11] 4,190,493
[45] Feb. 26, 1980

[54] COATED STRUCTURAL COMPONENT FOR A HIGH TEMPERATURE NUCLEAR REACTOR

[75] Inventor: Kim S. Yee, Zurich, Switzerland

[73] Assignee: Sulzer Brothers Limited, Winterthur, Switzerland

[21] Appl. No.: 862,422

[22] Filed: Dec. 20, 1977

Related U.S. Application Data

[63] Continuation of Ser. No. 660,862, Feb. 24, 1976, abandoned.

[30] Foreign Application Priority Data

Feb. 26, 1975 [CH] Switzerland .......................... 2420/75

[51] Int. Cl.² ............................................. B32B 15/00
[52] U.S. Cl. ......................................... 176/60; 176/88; 204/38 S; 428/663; 428/665; 428/680; 428/926
[58] Field of Search ..................... 176/88, 60; 428/660, 428/665, 680, 663, 926; 204/38 S

[56] References Cited

U.S. PATENT DOCUMENTS

| | | | |
|---|---|---|---|
| 2,815,299 | 12/1957 | Raymond | 427/253 |
| 3,474,010 | 10/1969 | McMullen et al. | 204/40 |
| 3,597,172 | 8/1971 | Bunghardt et al. | 428/652 |
| 3,647,517 | 3/1972 | Milidantri et al. | 428/656 |
| 4,002,782 | 1/1977 | Warner et al. | 428/665 |

*Primary Examiner*—Arthur J. Steiner
*Attorney, Agent, or Firm*—Kenyon & Kenyon

[57] ABSTRACT

A protective layer of tungsten or molybdenum is tightly adhered via an intermediate layer of pure nickel to a substratum of nickel-base alloy containing a carbide-former. The protected substratum is used in the structural components for a helium cooling circuit of a high temperature nuclear reactor. The protective layer is of a thickness of from 0.5 to 0.2 millimeters while the intermediate layer is of a thickness of 0.01 to 0.05 millimeters.

4 Claims, No Drawings

COATED STRUCTURAL COMPONENT FOR A HIGH TEMPERATURE NUCLEAR REACTOR

This application is a continuation of copending application Ser. No. 660,862, filed Feb. 24, 1976 now abandoned.

This invention relates to A Coated Structural Component For A High Temperature Nuclear Reactor And A Process Of Coating The Same.

BACKGROUND OF THE INVENTION

As is known, high temperature nuclear reactors utilize helium in a primary cooling circuit in order to cool the reactors. However, the medium circulating in these primary cooling circuits generally contain small quantities of impurities, for example, water and/or hydrogen, which react with the graphite of the reactor to form carbon monoxide and methane. Traces of nitrogen may also be present as further impurities. In addition, the ordinarily-used nickel-base alloys for the structural parts of this primary circuit contain, as alloying additives, titanium and chromium. Both of these, especially in the case of the high temperatures of some 1000° C. prevailing in these circuits, react with the carbon of the carbon-containing impurities, and, through carbonizing and forming carbide, lead to a deterioration of the mechanical characteristics of the nickel-base alloys.

Accordingly, it is an object of the invention to provide a protective layer for structural components used in high temperature nuclear reactors which is able to prevent carbonization of the base material.

It is another object of the invention to form a protective layer on a nickel-base alloy containing a carbode former in a relatively simple manner.

Briefly, the invention provides a protectively coated structural component for a helium cooling circuit of a high temperature nuclear reactor as well as a process for forming the protective layer in a pore-free manner.

The structural component comprises a substratum of a nickel-base alloy containing a carbide-former, an intermediate layer of nickel of at least ninety-nine percent (99%) purity anchored on at least a portion of the substratum, and a pore-free protective layer on the intermediate layer of a metal selected from the group consisting of tungsten and molybdenum.

The protective layer is of a thickness of from 0.05 to 0.2 millimeters while the intermediate layer is of a thickness of 0.01 to 0.05 millimeters.

The process of forming the protective layer includes the steps of cleaning the substratum, galvanically depositing a layer of nickel of at least ninety-nine percent (99%) purity on the substratum to form an intermediate layer, and thereafter, a layer of a metal selected from a group consisting of tungsten and molybdenum is deposited by a gas or vapor deposition process on the intermediate layer.

The protective layer effects a bonding of the carbon in the carbon-containing impurities in the cooling circuit into the protective layer as tungsten carbide or molybdenum carbide ($W_2C$ and $Mo_2C$ respectively) to form a very stable layer of protection against further carbonization. Thus, the intermediate layer of pure nickel has a double function. In the first place, the intermediate layer improves the adhesion of the protective layer on the substratum. In the second place, the intermediate layer inhibits a decarbonization of the substratum through a reaction of its contained carbon with the protective layer.

In addition, the protectively coated structural components have the further substantial advantage that protection is simultaneously obtained against an oxidation attack on the basic material, while an oxidation of the protective layer itself is not to be feared, even at the maximum prevailing temperatures.

The vapor deposition process is followed by a diffusion heat treatment which may be carried out both in a vacuum of some $10^{-4}$ millimeters of mercury (mm Hg) or else in an inert-gas atmosphere, e.g. argon or helium, in known manner in order to improve the adhesion of the protective layer on the intermediate layer, or of that layer on the substratum.

Further, advantages have been found to result when the pure-nickel intermediate layer is applied through a galvanic process, e.g. electroplating, because such nickel layers are free of phosphorus or boron impurities, which might lead to undesirable reactions between the nickel and protective-layer elements.

The heat treatment is accomplished at a temperature between 800° C. and 1200° C., being held for about 12 hours at 800° C. and about two hours at 1200° C. A following cooling-down is carried out in the treatment furnace slowly, likewise in a vacuum or in an inert-gas atmosphere.

The nickel-base alloys which contain a carbide former and which are used in making the structural components for a helium cooling circuit of a high temperature nuclear reactor generally have at least the following components in percent by weight:
0.02 to 0.15% carbon
5.5 to 16% chromium
3 to 13% of the sum of molybdenum and tungsten
6 to 11% of the sum of aluminum and titanium and base nickel i.e. the remainder is nickel with alloy components as commonly used in nickel superalloys.

The invention is explained in more detail in the following example.

In the following example there serves as the substratum the familiar nickel-base alloy IN 713 LC (as designated in the INCO Company publication "Information Paper of Henry Wiggin and Company, Inc., 1973)". Upon this substratum, there is to be applied a tungsten layer. For the coating process, use is made of the familiar gas deposition process, i.e. a chemical gas-phase depositing (CVD process). This process allows a dense coating largely free of pores to be readily obtained. As the initial substance for the CVD process, use is made of tungsten-hexafluoride ($WF_6$).

Before being coated with tungsten, the substratum is first cleaned and degreased, and then installed as a cathode in a nickel-salts bath - a mixture of $NiSO_4$, $NiCL_2$, $H_3BO_3$ and wetting agents. Because of the current flowing through the bath, usually having an intensity somewhere between 0.4 to 4.0 A/dm$^2$, nickel becomes deposited galvanically on the stubstratum until there is a layer of pure nickel about 0.02 millimeters (mm) thick. The purity of this nickel layer is at least 99%, whereby the chief impurity is sulfur. The current intensity with the example given amounts to 1.0 A/dm$^2$, and with it the rate of deposit in some 0.2 microns per minute ($\mu$m/min).

The substratum, provided with the nickel protective layer, is then placed in a CVD apparatus of known construction and heated to about 650° C. with argon of atmospheric pressure with an argon flow of 0.5 liter/minute.

The gaseous tungsten hexafluoride (WF$_6$) already at the surrounding temperature, is fed into the apparatus at a rate of 105 milliliters per minute (ml/min), mixed in a hydrogen flow of 450 milliliters per minute as a carrier gas, passed into the reaction space of the apparatus and passed over the substratum surface. The gas mixture then reacts, whereby the tungsten is separated on the surface, while the fluorine portion is conducted away from the reaction space in gaseous form.

The depositing process is continued for some 30 minutes, while the reaction is maintained under a total pressure of about 150 millimeters of mercury (mm Hg). Under the described conditions, the treatment of approximately 30 minutes yields a deposited tungsten layer of some 0.06 millimeters (mm).

The following diffusion heat treatment can be carried out in a vacuum of $10^{-4}$ mm Hg. In this case, the cleaned substratum is heated within an hour, starting out from room temperature, until 650° C. is reached. A further rise in temperature to the end temperature of 950° C., which corresponds approximately to the temperature level prevailing in the reactor circuit is then performed which requires 3.5 hours. The end temperature is maintained for about 2 hours. Thereafter, a final cooling down to room temperature takes about 9 hours in the furnace itself.

The application of a molybdenum protective layer is done in the same way as described above, using substantially the same operative data, whereby only tungsten hexafluoride WF$_6$ is replaced by molybdenum hexafluoride MoF$_6$, whose vaporization requires a somewhat higher temperature.

What is claimed is:

1. In a helium cooling circuit of a high temperature nuclear reactor, a structural component comprising
   a substratum of a nickel-base alloy containing a carbide-former, said alloy comprising in percent by weight at least
   0.02 to 0.15% carbon
   5.5 to 16% chromium
   3 to 13% of the sum of molybdenum and tungsten
   6 to 11% of the sum of aluminum and titanium
   and the remainder being nickel;
   an intermediate layer of nickel of at least 99% purity anchored on at least a portion of said substratum; and
   a pore-free protective layer on said intermediate layer of a metal selected from the group consisting of tungsten and molybdenum, said protective layer being sufficient to bond carbon from carbon containing impurities in said circuit into said protective layer as a carbide to form a very stable layer of protection against further carbonization;
   said intermediate layer being sufficient to inhibit a decarbonization of said substratum through a reaction of carbon therein with said protective layer.

2. A structural component as set forth in claim 1 wherein said protective layer is of a thickness of from 0.05 to 0.2 millimeters and said intermediate layer is of a thickness of from 0.01 to 0.05 millimeters.

3. A structural component as set forth in claim 2 wherein said intermediate layer is electroplated on said substratum.

4. A structural component as set forth in claim 2 wherein said alloy is IN 713 LC.

* * * * *

UNITED STATES PATENT AND TRADEMARK OFFICE
CERTIFICATE OF CORRECTION

PATENT NO. : 4,190,493
DATED : February 26, 1980
INVENTOR(S) : Kim Shee Yee

It is certified that error appears in the above—identified patent and that said Letters Patent is hereby corrected as shown below:

Column 1, line 34, change "carbode" to --carbide--

Column 2, line 58, change "stubstratum" to --substratum--

Signed and Sealed this

Twenty-fourth Day of June 1980

[SEAL]

Attest:

SIDNEY A. DIAMOND

Attesting Officer

Commissioner of Patents and Trademarks